(12) United States Patent
Thorogood et al.

(10) Patent No.: US 12,064,055 B2
(45) Date of Patent: Aug. 20, 2024

(54) COOKING APPLIANCE

(71) Applicant: BREVILLE PTY LIMITED, Alexandria (AU)

(72) Inventors: Michael Thorogood, Alexandria (AU); Emma Larkin, Alexandria (AU); Byron Ashley Marsh-Croft, Alexandria (AU); Marian Silviu Rosian, Alexandria (AU); Brendan John Foxlee, Alexandria (AU); Vyvyan Rose, Alexandria (AU); John Chul-Won Lee, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 453 days.

(21) Appl. No.: 17/425,072

(22) PCT Filed: Jan. 23, 2020

(86) PCT No.: PCT/AU2020/050040
§ 371 (c)(1),
(2) Date: Jul. 22, 2021

(87) PCT Pub. No.: WO2020/150780
PCT Pub. Date: Jul. 30, 2020

(65) Prior Publication Data
US 2022/0095834 A1    Mar. 31, 2022

(30) Foreign Application Priority Data

Jan. 24, 2019  (AU) ................................ 2019900220
Jan. 29, 2019  (AU) ................................ 2019900256

(51) Int. Cl.
A47J 37/06   (2006.01)
F24C 15/02   (2006.01)
(Continued)

(52) U.S. Cl.
CPC ......... *A47J 37/0658* (2013.01); *F24C 15/023* (2013.01)

(58) Field of Classification Search
CPC . A47J 37/0629; A47J 37/0658; F24C 15/022; F24C 15/023
See application file for complete search history.

(56) References Cited

U.S. PATENT DOCUMENTS 2,313,582 A   3/1943   Rees
2,683,446 A   7/1954   Groff
(Continued)

FOREIGN PATENT DOCUMENTS

AU   2007353612 A1   11/2008
CN   201771308 U    3/2011
(Continued)

OTHER PUBLICATIONS

International Search Report for Application No. PCT/AU2020/050040 mailed Mar. 16, 2020.
(Continued)

*Primary Examiner* — Michael G Hoang
*Assistant Examiner* — Logan P Jones
(74) *Attorney, Agent, or Firm* — KDW Firm PLLC

(57) ABSTRACT

A cooking appliance (100) including: a hollow body (102) having an interior (110) to receive a product to be cooked, the body (102) having an opening (112) via which product to be cooked can be moved relative to the interior (110); a door (114) attached to the body (102) and movable relative thereto between a closed position at which the door (114) closes the opening, and a maximum open position at which the door (114) is spaced from the open position by a maximum predetermined distance; and a latch mechanism (122) operatively associated with the body (102) and the door (114) to at least aid in retaining the door (114) in at least
(Continued)

one intermediate position at which the door (114) is spaced from the closed position and the maximum open position, the mechanism (122) including an abutment member (142) fixed to the body (102), and a position defining member (124) attached to the door (114) and the body (102), the position defining member (124) having a plurality of position defining portions including a first portion (123a), a second portion (123b), and a third portion (123c), with the first portion (123a) corresponding to the closed position, the second portion (123b) corresponding to the intermediate position, and the third portion (123c) corresponding to the maximum open position, with the position defining member (124) being urged into contact with the abutment member (142) so that the abutment member (142) engages with a selected one of the portions (123a-c) so as to at least aid in retaining the door (114) in a selected one of the positions.

15 Claims, 10 Drawing Sheets

(51) Int. Cl.
    *F24C 15/24*                (2006.01)
    *F24C 15/16*                (2006.01)
    *F24C 15/22*                (2006.01)

(56) References Cited

U.S. PATENT DOCUMENTS

| | | | |
|---|---|---|---|
| 2,776,655 A * | 1/1957 | Ferguson, Jr. | F24C 15/023 |
| | | | 126/194 |
| 2,780,219 A | 2/1957 | Pollock | |
| 2,823,661 A * | 2/1958 | Grannan | F24C 15/023 |
| | | | 16/80 |
| 2,934,783 A | 5/1960 | Johnson | |
| 3,003,495 A | 10/1961 | Coultrip | |
| 3,072,117 A | 1/1963 | Stoligrosz et al. | |
| 3,114,364 A | 12/1963 | Cullen et al. | |
| 3,150,659 A | 9/1964 | Ellis et al. | |
| 3,304,932 A * | 2/1967 | Gilliom | F24C 15/023 |
| | | | 126/194 |
| 3,398,735 A * | 8/1968 | Barber | F24C 15/023 |
| | | | 126/194 |
| 3,450,125 A | 6/1969 | Hopkins | |
| 3,453,996 A * | 7/1969 | Agee | F24C 15/023 |
| | | | 126/194 |
| 3,842,542 A * | 10/1974 | White | F24C 15/023 |
| | | | 49/386 |
| 4,315,495 A * | 2/1982 | Jellies | E05D 7/12 |
| | | | 126/192 |
| 4,656,337 A * | 4/1987 | Lastofka | A47J 37/0635 |
| | | | 219/521 |
| 5,291,634 A | 3/1994 | Zanetti | |
| 5,315,922 A * | 5/1994 | Keller | A47J 36/06 |
| | | | 99/422 |
| 5,341,542 A | 8/1994 | Hannan et al. | |
| 5,496,987 A * | 3/1996 | Siccardi | F24C 7/046 |
| | | | 219/386 |
| 7,173,217 B2 * | 2/2007 | De'Longhi | F24C 15/162 |
| | | | 219/393 |
| 2011/0023861 A1 * | 2/2011 | Hensel | F24C 15/12 |
| | | | 126/273 R |
| 2013/0276643 A1 * | 10/2013 | Krolick | F24B 1/003 |
| | | | 99/447 |
| 2016/0309956 A1 * | 10/2016 | Glucksman | A47J 37/047 |

FOREIGN PATENT DOCUMENTS

| | | | | |
|---|---|---|---|---|
| FR | 2614645 A1 * | 11/1988 | | |
| GB | 619383 A | 3/1949 | | |
| RU | 2395040 C1 * | 7/2010 | | F24C 15/023 |

OTHER PUBLICATIONS

The Extended European Search Report dated Sep. 6, 2022, for Application No. 20745801.9 (eight (8) pages).

* cited by examiner

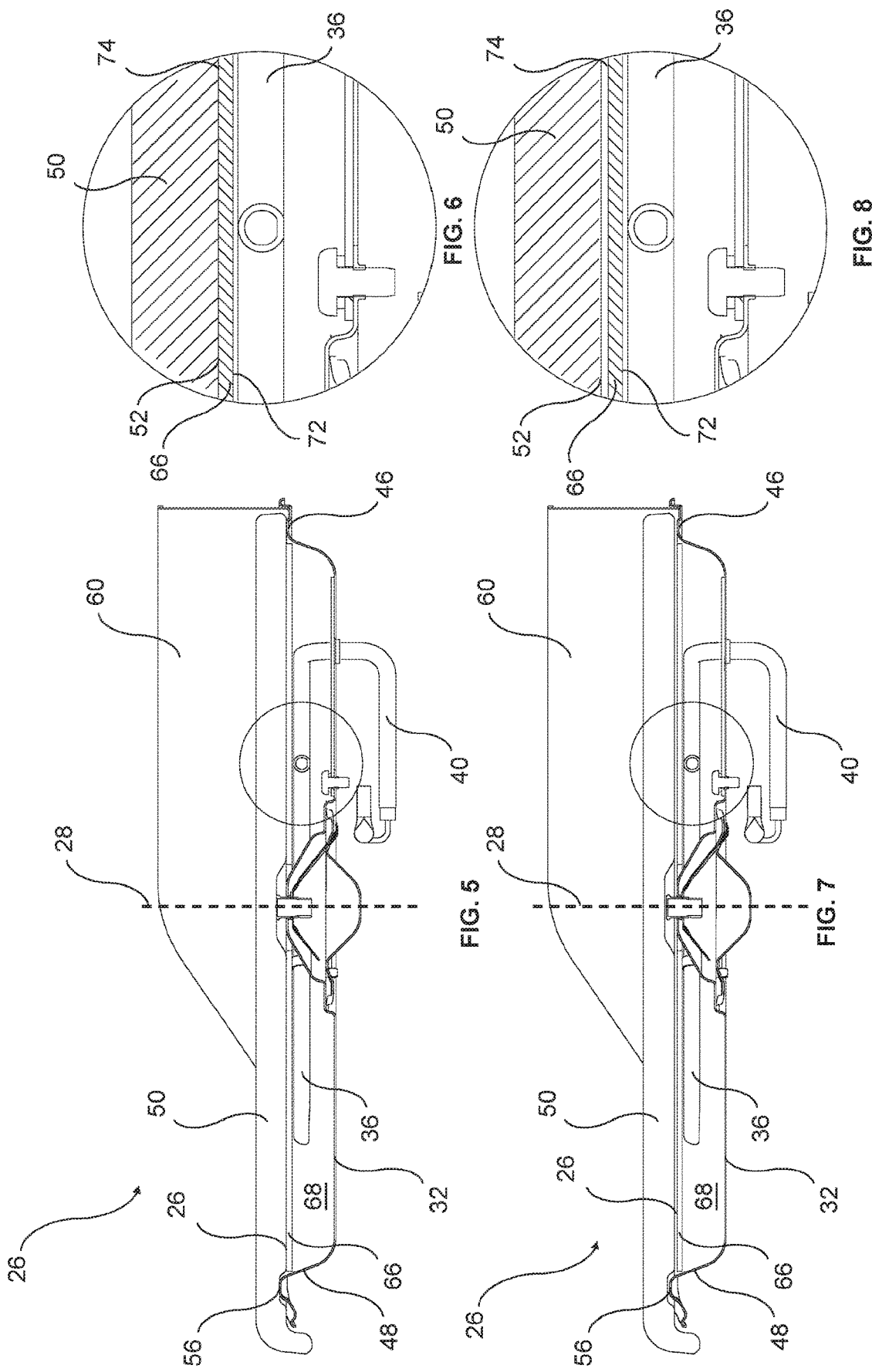

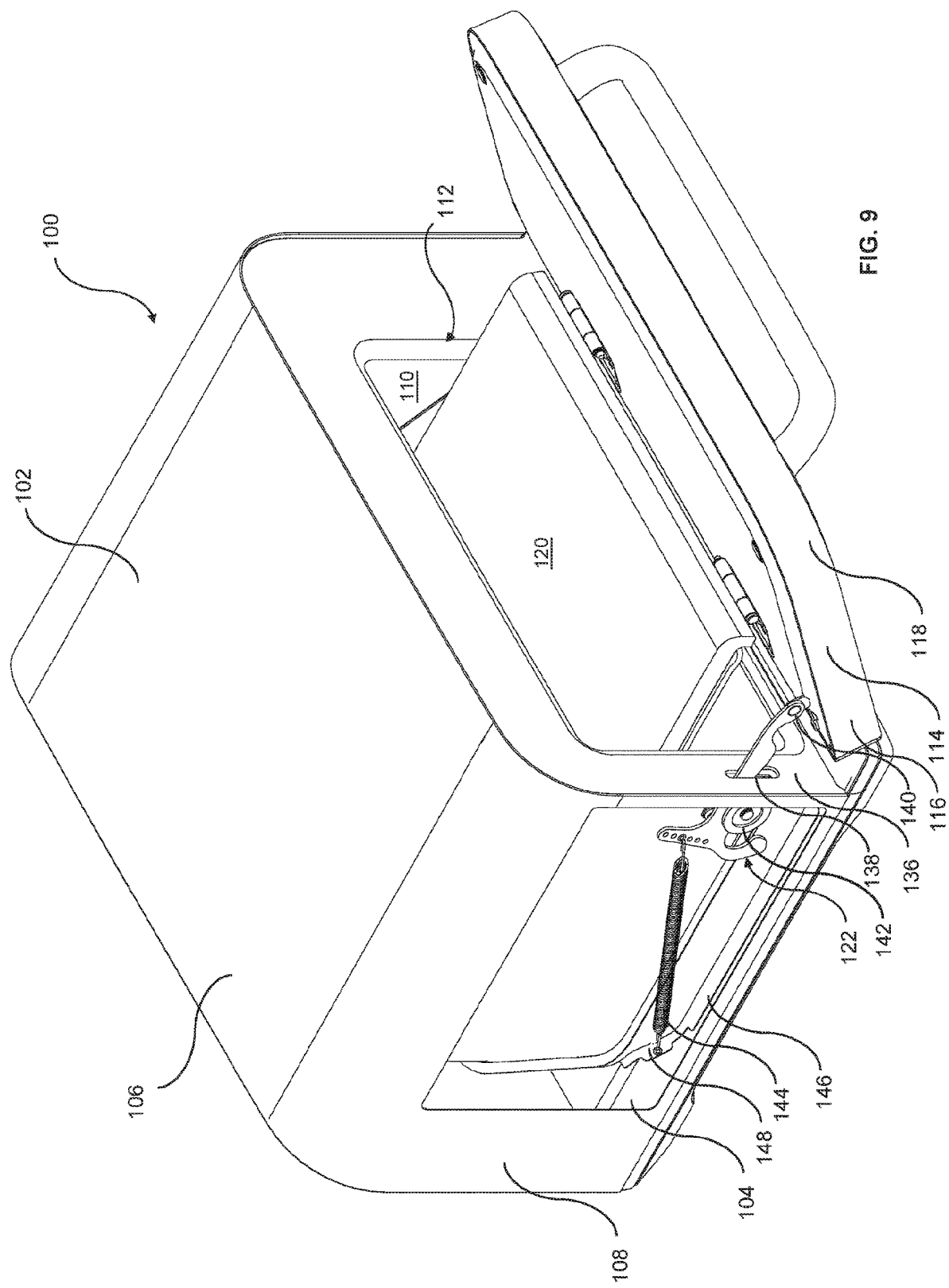

COOKING APPLIANCE

FIELD

The present invention relates to cooking appliances, and more particularly, but not exclusively to appliances for cooking pizza.

BACKGROUND

Appliances used to cook pizza, such as an oven, provide for circulation of heat around a cavity within which the pizza is being cooked. The oven includes heating elements positioned within the cavity to radiate heat around the cavity to cook the pizza. Typically, one of the heating elements is positioned adjacent a cooking surface on which the pizza sits to be cooked. The oven provides a door to close the cavity during operation of the oven. Opening the door to the oven to move pizza relative to the cavity undesirably allows heat to escape from the cavity thereby reducing the temperature of the cavity and may cause uneven cooking of the pizza. Moreover, opening the door to the oven exposes the user to a risk of burns from heat exposure from the cavity or the heating elements. Furthermore, the heat radiating from the heating element adjacent the cooking surface may cause the surface to fail.

OBJECT

It is an object of the present invention to substantially overcome, or at least ameliorate, one of more of the above disadvantages.

SUMMARY OF INVENTION

There is disclosed herein a cooking appliance including:
a housing including a chamber within which a product is placed when being cooked, the housing including a door that closes an opening via which the product is placed in and removed from the chamber;
a heating element located in the chamber that heats the chamber via radiation and convection;
a movable tray upon which the product rests in the chamber when the product is being cooked; and
a barrier member fixed to the tray so as to move therewith, the member being located below the tray so as to be positioned between the tray and element so that radiation produced by the element is directed at the member.

There is also disclosed herein a pizza oven to cook a pizza, the oven including:
a housing including a chamber within which the pizza is placed when being cooked, the housing including a door that closes an opening via which the pizza is placed in and removed from the chamber;
a heating element located in the chamber that heats the chamber via radiation and convection;
a movable tray upon which the pizza rests in the chamber when the pizza is being cooked; and
a barrier member fixed to the tray so as to move therewith, the member being located below the tray so as to be positioned between the tray and element so that radiation produced by the element is directed at the member.

Preferably, the member is provided by a plate.
Preferably, the tray and plate are laminated.
Preferably, the plate has a thickness in the range of about 0.5 mm to 3 mm.
Preferably, the plate has a first major surface and a second major surface, with the first major surface being exposed to the element, and with the second major surface being faced toward the tray.
Preferably, the first major surface is spaced from the element.
Preferably, the tray is fixed to the door so as to move therewith.
Preferably, the plate is made of metal.

There is further disclosed herein a pizza oven to cook a pizza, the oven including:
a housing including a chamber within which the pizza is placed when being cooked, the housing including a door that closes an opening via which the pizza is placed in and removed from the chamber;
a heating element located in the chamber that heats the chamber via radiation and convection;
a movable tray upon which the pizza rests in the chamber when the pizza is being cooked; and
a barrier member spaced from the tray, the member being located below the tray so as to be positioned between the tray and element so that radiation produced by the element is directed at the member.

Preferably, the member is provided by a plate.
Preferably, the plate has a thickness in the range of about 0.5 mm to 3 mm.
Preferably, the plate has a first major surface and a second major surface, with the first major surface being exposed to the element, and with the second major surface being faced toward the tray.
Preferably, the first major surface is spaced from the element.
Preferably, the tray is fixed to the door so as to move therewith.
Preferably, the plate is made of metal.

There is further disclosed herein a cooking appliance including:
a hollow body having an interior to receive a product to be cooked, the body having an opening via which product to be cooked can be moved relative to the interior;
a door attached to the body and movable relative thereto between a closed position at which the door closes the opening, and a maximum open position at which the door is spaced from the open position by a maximum predetermined distance; and
a latch mechanism operatively associated with the body and the door to at least aid in retaining the door in at least one intermediate position at which the door is spaced from the closed position and the maximum open position, the mechanism including an abutment member fixed to the body, and a position defining member attached to the door and the body, the position defining member having a plurality of position defining portions including a first portion, a second portion, and a third portion, with the first portion corresponding to the closed position, the second portion corresponding to the intermediate position, and the third portion corresponding to the maximum open position, with the position defining member being urged into contact with the abutment member so that the abutment member engages with a selected one of the portions so as to at least aid in retaining the door in a selected one of the positions.

Preferably, the position defining member includes sockets, each socket corresponding to a respective one of the position defining portions, with the abutment member received within a selected one of the sockets to retain the door in the selected position.

Preferably, the position defining member is pivotally attached to the door.

Preferably, the position defining member is longitudinally elongated, with a first end part pivotally attached to the door, and a second end part attached to the body.

Preferably, the second end part is attached to the body by a spring that urges the position defining member into contact with the abutment member.

Preferably, the abutment member is in the form of a wheel attached to the body.

Preferably, the door is hinged to the first end part about a lower portion of the door such that an upper portion of the door travels in an arc as the door is opened.

Preferably, the body has a frame surrounding the opening, with the frame having a slot positioned relative to the lower portion of the door, with the position defining member at least partially extending through the slot.

Preferably, the second end part includes a plurality of attachment points, with the spring being configured to be removably attached to one of the attachment points to adjust tension of the spring.

BRIEF DESCRIPTION OF DRAWINGS

Preferred forms of the present invention will now be described by way of example with reference to the accompanying drawings wherein:

FIG. 5 is a schematic cross-sectional view of the deck of FIG. 3;

FIG. 6 is an enlarged detail view of a tray, plate and element of the deck of FIG. 3;

FIG. 7 is a schematic cross-sectional view of a deck according to another embodiment; and FIG. 8 is an enlarged detail view of a tray, plate and element of the deck of FIG. 7.

FIG. 9 is a simplified schematic part cut away isometric view of a cooking appliance according to an embodiment of the present invention;

DESCRIPTION OF EMBODIMENTS

Figure 1:
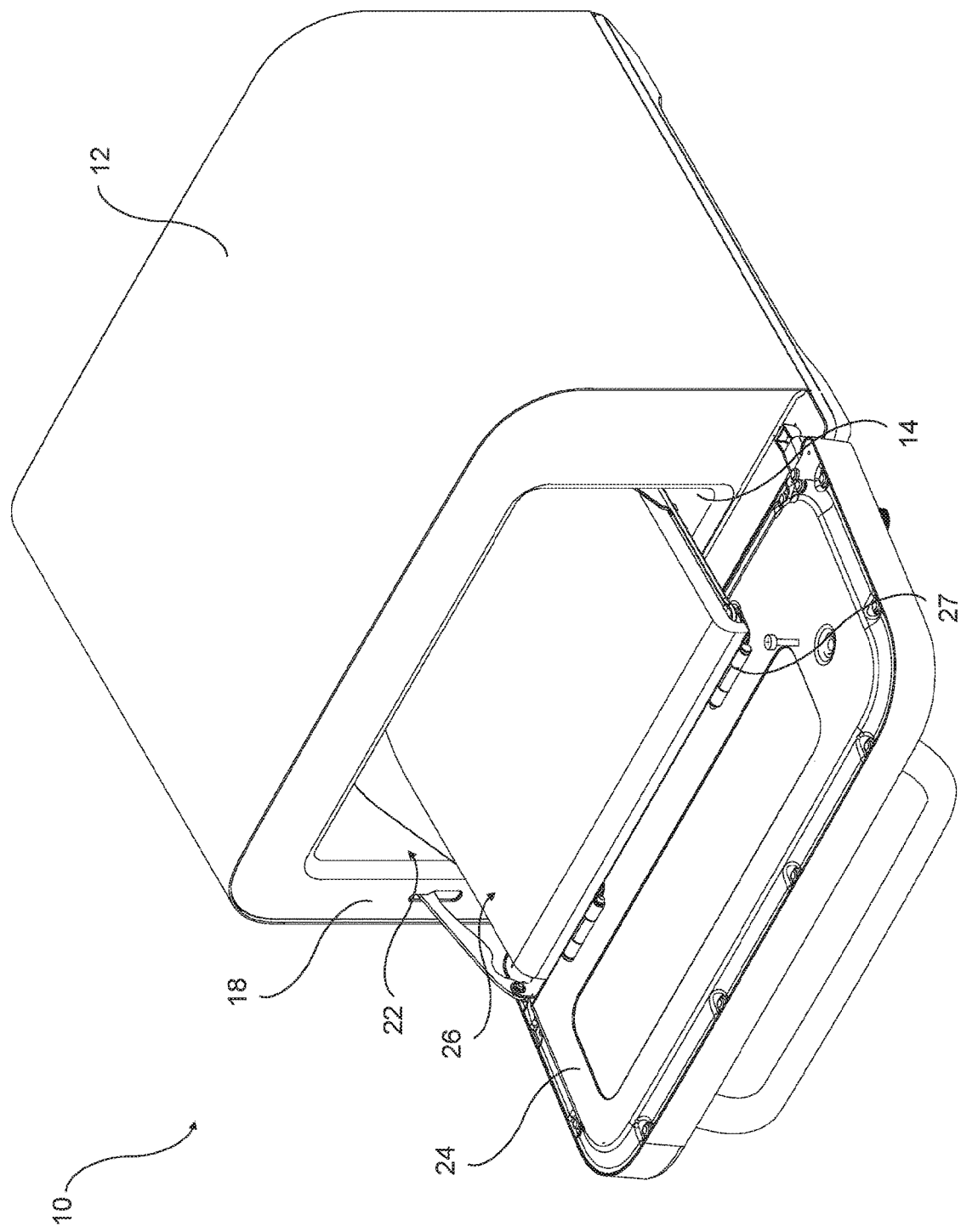
FIG. 1 is a schematic isometric view of a cooking appliance according to an embodiment.
Figure 2:
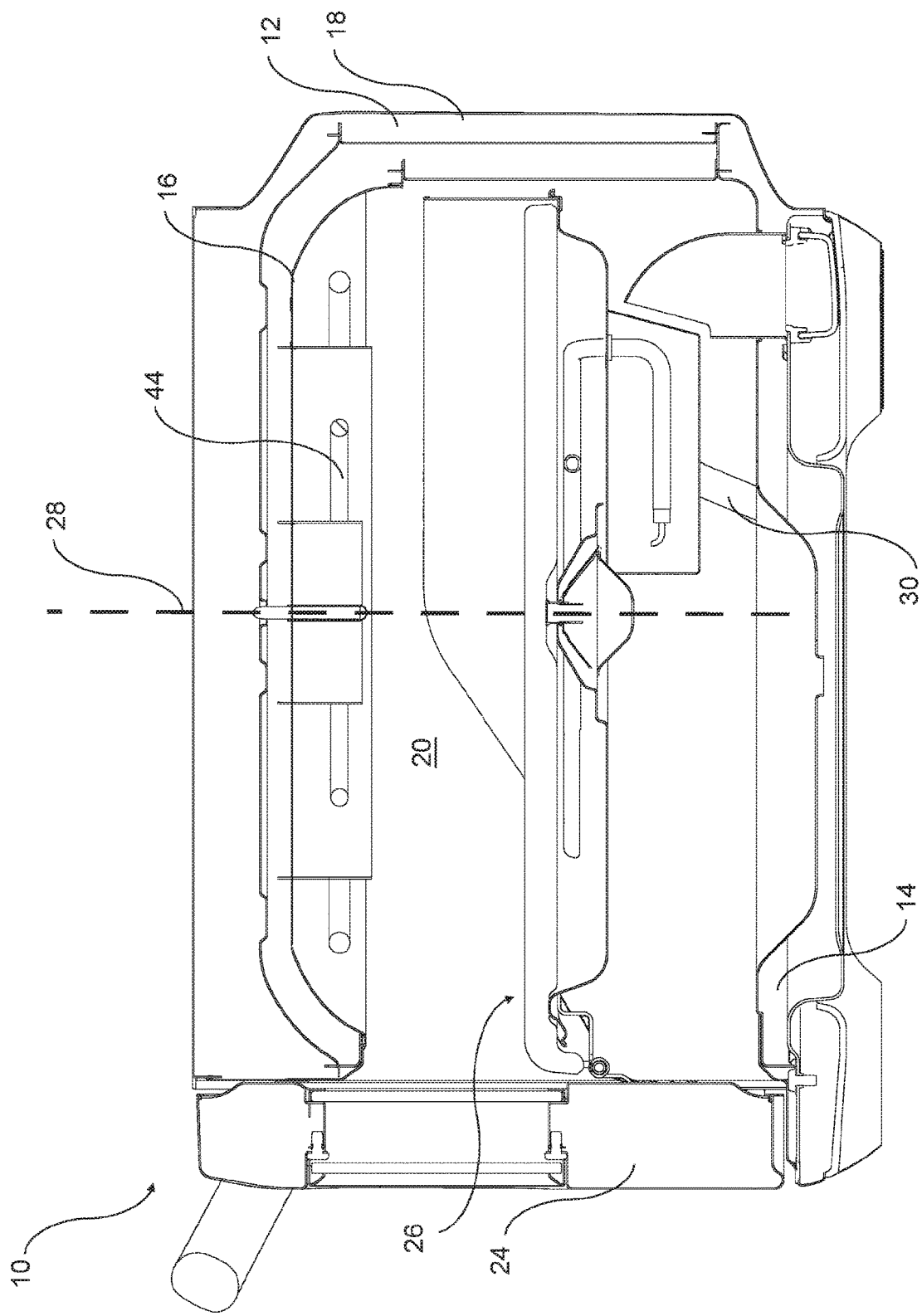
FIG. 2 is a schematic cross-sectional view of the cooking appliance of FIG. 1.

Referring to FIGS. 1 to 8 of the accompanying drawings there is depicted a cooking appliance 10, such as a pizza oven, to cook a pizza (not shown). The appliance 10 has a body or housing 12 providing a floor 14, a ceiling 16, and an intermediate wall 18 extending between the floor 14 and the ceiling 16. The floor 14, ceiling 16, and wall 18 at least partly surround a cooking chamber 20.

The housing 12 has an opening 22 via which the pizza that is to be cooked can be moved in and out of the chamber 20. The opening 22 is closed by a door 24 which is hinged to the housing 12 at a lower portion of the door 24.

The appliance 10 includes a deck 26 mounted to the floor 14 for receiving the pizza. A central axis 28 of the deck 26 extends perpendicularly between the floor 14 and the ceiling 16.

The deck 26 is pivotally attached to the door 24 via hinges 27. A rear portion of the deck 26 is pivotally attached to rear support arms 30 that are linked to the floor 14. In this way, when the door 24 is opened, the deck 26 moves with the door 24, traveling out of the chamber 20 and lowering as the door 24 rotates on its lower hinges. The rear support arms 30 rotate with the movement of the deck 26 to keep the deck 26 generally horizontal.

Figure 3:
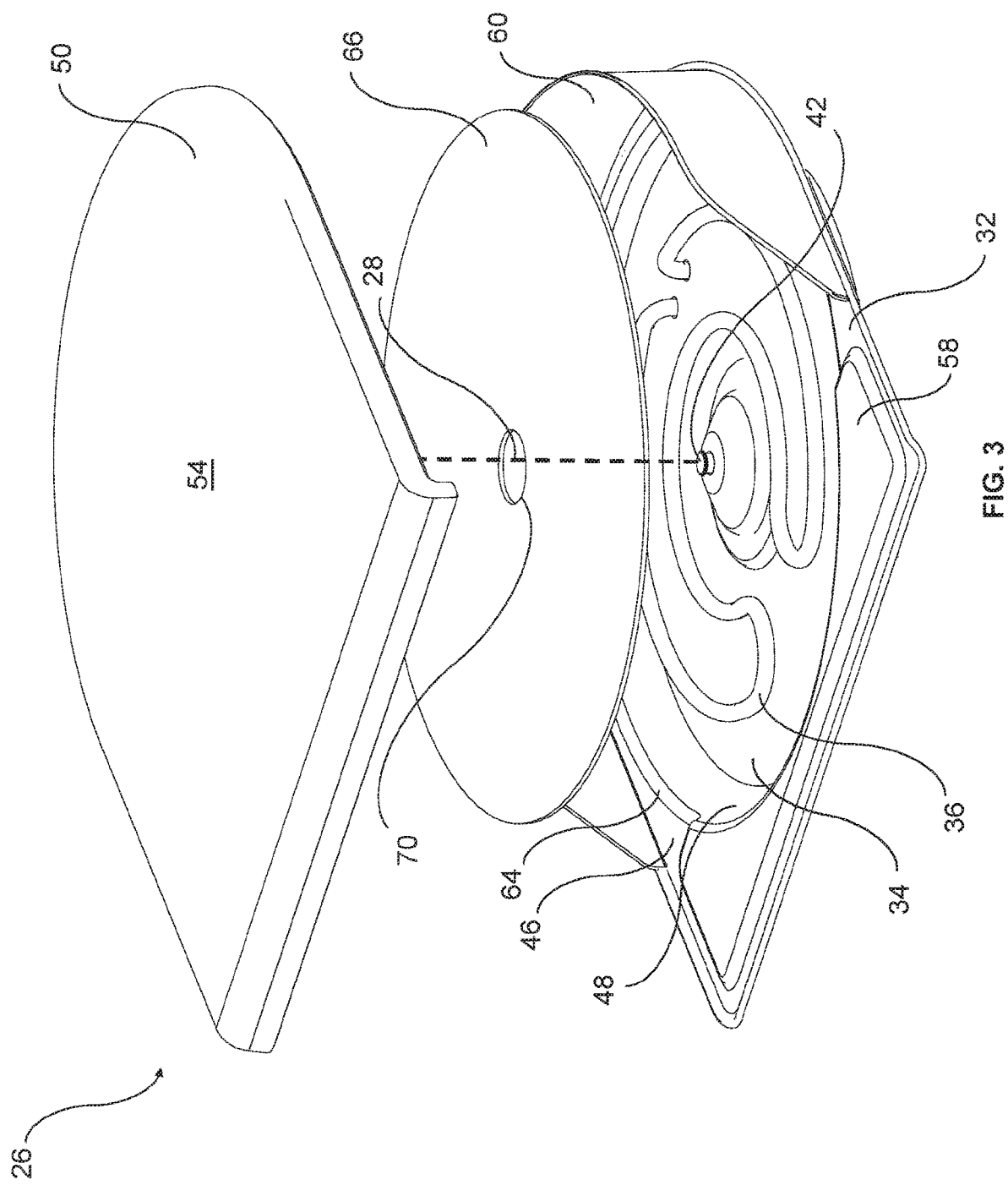
FIG. 3 is a schematic parts exploded isometric view of a deck of the appliance of FIG. 1.
Figure 4:
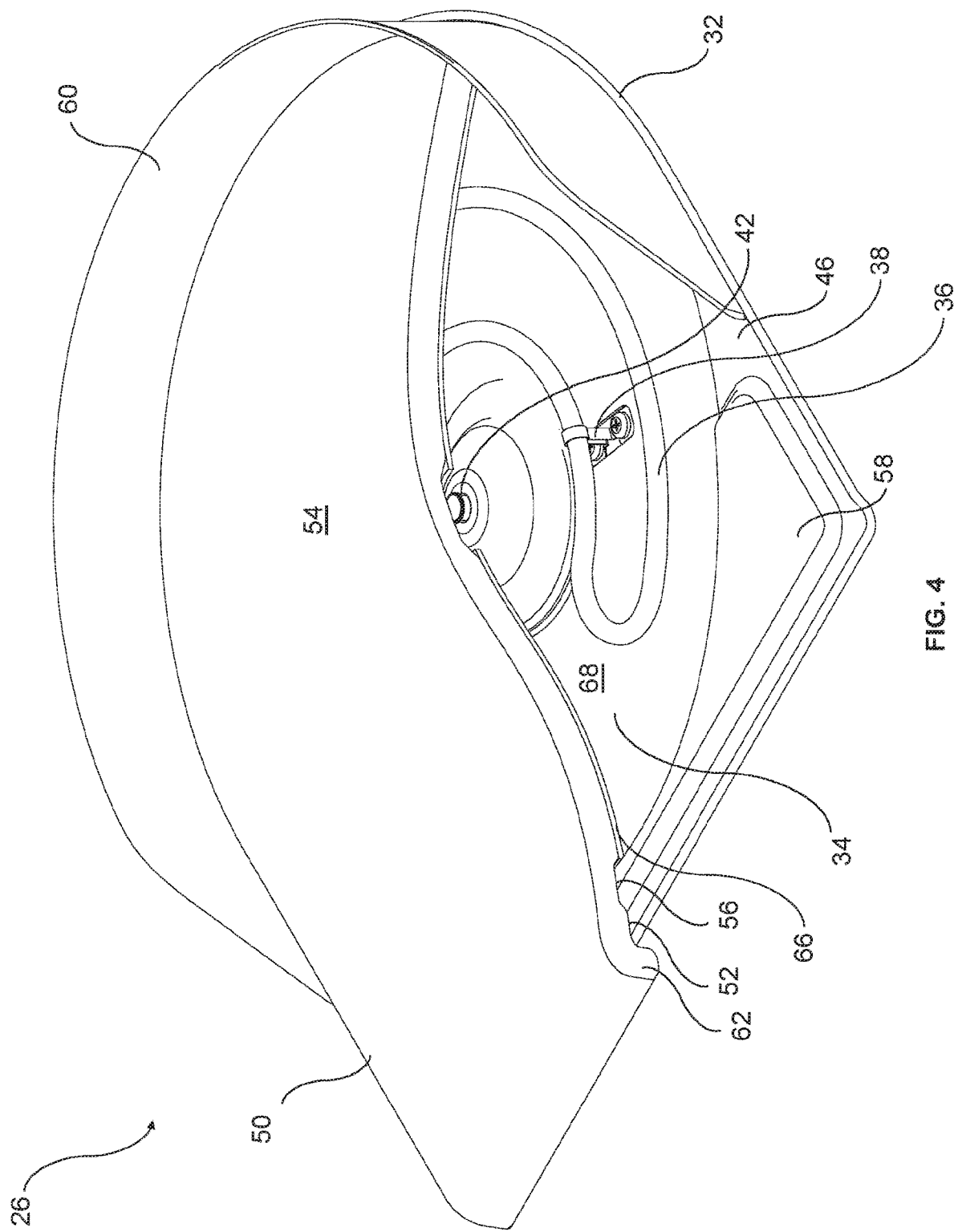
FIG. 4 is a schematic part cutaway isometric view of the deck of FIG. 3.

With particular reference to FIG. 3, the deck 26 includes a carriage 32. The carriage 32 has a platform 34 centrally located on the axis 28 and extending generally radially outwardly from the axis 28. In this embodiment, the platform 34 is generally circular. The platform 34 houses a heating element 36 to heat the chamber 20 via radiation and convection. The element 36 has a generally circular transverse cross-section and extends in a butterfly arrangement generally in a plane symmetrically around the axis 28. Although, it will be appreciated that other arrangements of the element 36 may be envisaged. The element 36 is secured to the platform 34 by retaining brackets 38 screwed into the platform 34 (as shown in FIG. 4). The element 36 has connectors 40 (shown in FIGS. 5 and 7) that protrude through the carriage 32 for connection to a power source (not shown) under control of a processor module (not shown). The processor module receives a temperature signal from a temperature sensor 42 (shown in FIG. 3) protruding from the platform 34. One or more upper heating elements 44 (shown in FIG. 2) may also be located around the ceiling 16 to deliver radiant energy to cook the pizza.

The carriage 32 has ledge 46 spaced upwardly along the axis 28 from the platform 34. A side wall 48 extends between the ledge and platform 46, 34 and is generally inclined away from the axis 28. The ledge 46 supports a tray 50. The tray 50 has an underside 52 (shown in FIG. 4) that abuts the ledge 46, and a cooking surface 54 upon which the pizza rests in the chamber 20 when the pizza is being cooked. The tray 50 has a groove 56 (shown in FIG. 4) formed along a portion of the underside 52 of the tray 50 for locating the tray 50 on a projection 58 of the ledge 46 to centrally locate the cooking surface 54 on the axis 28. The tray 50 may be made of ceramic, iron, steel, or concrete, although it will be appreciated that the tray 50 may be made of one or more appropriate materials. A rear shield 60 is provided around a rear edge portion of the ledge 46 to reduce the likelihood of the pizza positioned on the cooking surface 54 from sliding off the tray 50. The tray 50 has a lip 62 overhanging a front edge of the ledge 46 which may assist with placing and removing the pizza relative to the surface 54.

The carriage 32 also provides a rim 64 projecting from the side wall 48 between the ledge and platform 46, 34 to seat a barrier member in the form of a plate 66. The plate 66, side wall 48 and platform 34 surround a cavity 68 (shown in FIGS. 4, 5 and 7) in which the element 36 is located. In the embodiment depicted in FIGS. 5 and 6, the plate 66 and tray 50 are laminated so that the plate 66 is fixed to the tray 50 so as to move with the tray 50. The plate 66 is located below the tray 50 so as to be positioned between the tray 50 and the element 36 so that radiation produced by the element 36 is directed at the plate 66. A hole 70 (shown in FIG. 3) is formed through the plate 66 so that the sensor 42 projects through the plate 66 adjacent the tray 50 to monitor the temperature of the tray 50.

With particular reference to FIGS. 6 and 8, the plate 66 has a first major surface 72 and a second major surface 74. The first major surface 72 is exposed to and spaced from the element 36. In one embodiment, the second major surface 74 abuts the underside 52, as shown in FIG. 6. In another embodiment, the second major surface 74 is spaced from the underside 52, as shown in FIG. 8. In this alternative embodiment, the plate 66 is spaced from the tray 50 so that the tray 50 may be movable independently to the plate 66.

The spacing between the first major surface 72 and the element 36 may have a vertical dimension in the range of about 1-5 mm. The spacing between the second major surface 74 and the underside 52 may have a vertical dimension in the range of about 1-7 mm. Although, it will be appreciated that the vertical dimensions of the spacings may be varied to meet particular design criteria.

The plate 66 is preferably made of metal, such as aluminium, copper, iron or steel, although it will be appreciated that the plate 66 may be made of one or more appropriate materials. The plate 66 has a predetermined thickness which is typically in the range of about 0.5 mm to 3 mm. Although, it will be appreciated that the thickness may be varied.

The appliance 10 has the advantage that the plate 66 at least aids in exposing the underside 52 of the tray 50 to a substantially uniform temperature to at least reduce the formation of heat gradients in the tray 50 caused by the radiant energy from the element 36. This in turn may reduce the risk of the tray 50 failing.

Referring to FIGS. 9 to 13, there is depicted a cooking appliance 100 configured to cook a pizza (not shown). The appliance 100 includes a generally cuboidal body 102 providing a floor 104, a ceiling 106, and an intermediate wall 108 extending between the floor 104 and the ceiling 106. The floor 104, ceiling 106, and wall 108 at least partly surround an interior or cooking cavity 110.

Figure 11:
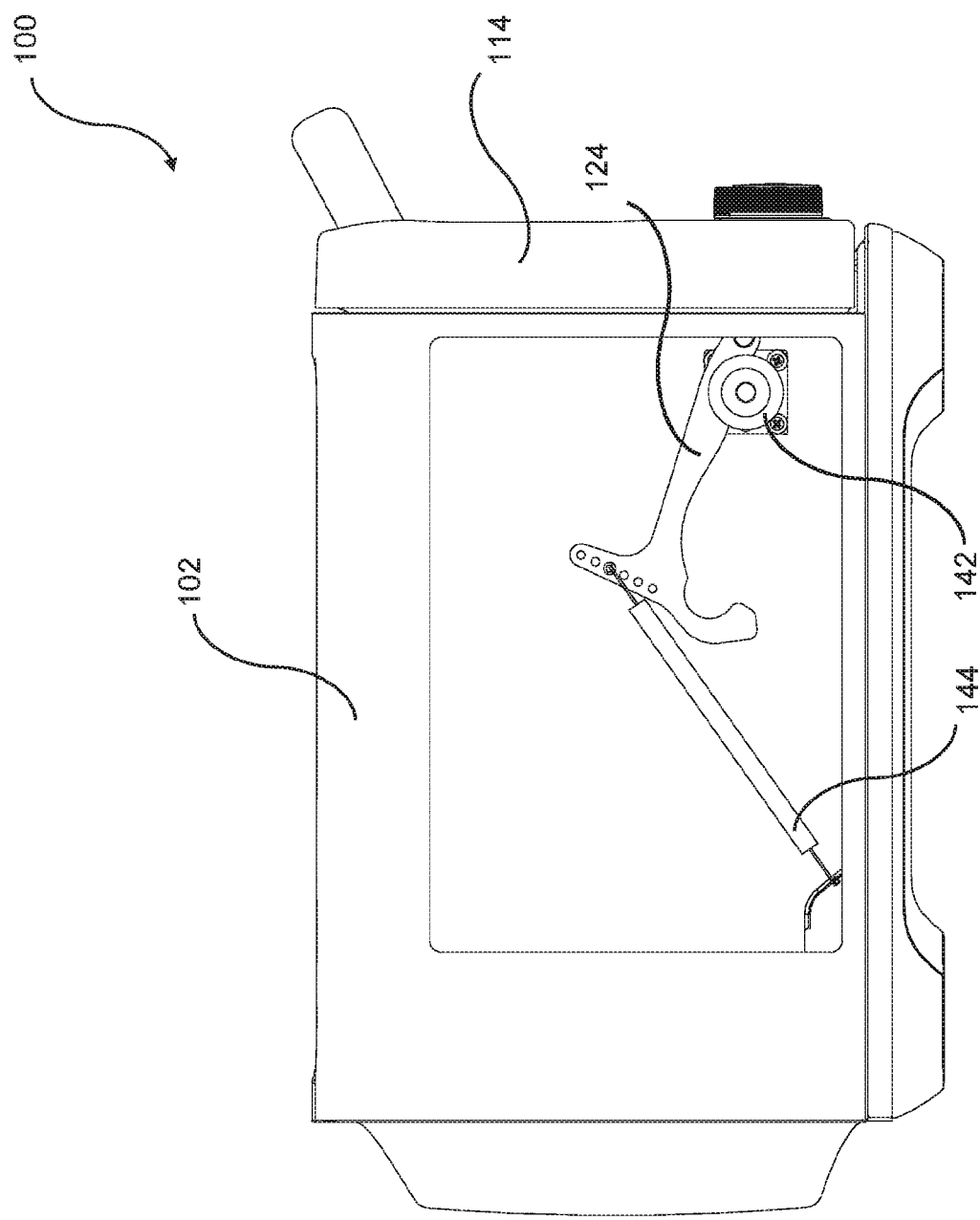
FIG. 11 is a simplified schematic part cut away side view of the cooking appliance of FIG. 9, shown with a door of the cooking appliance in a closed position.
Figure 13:
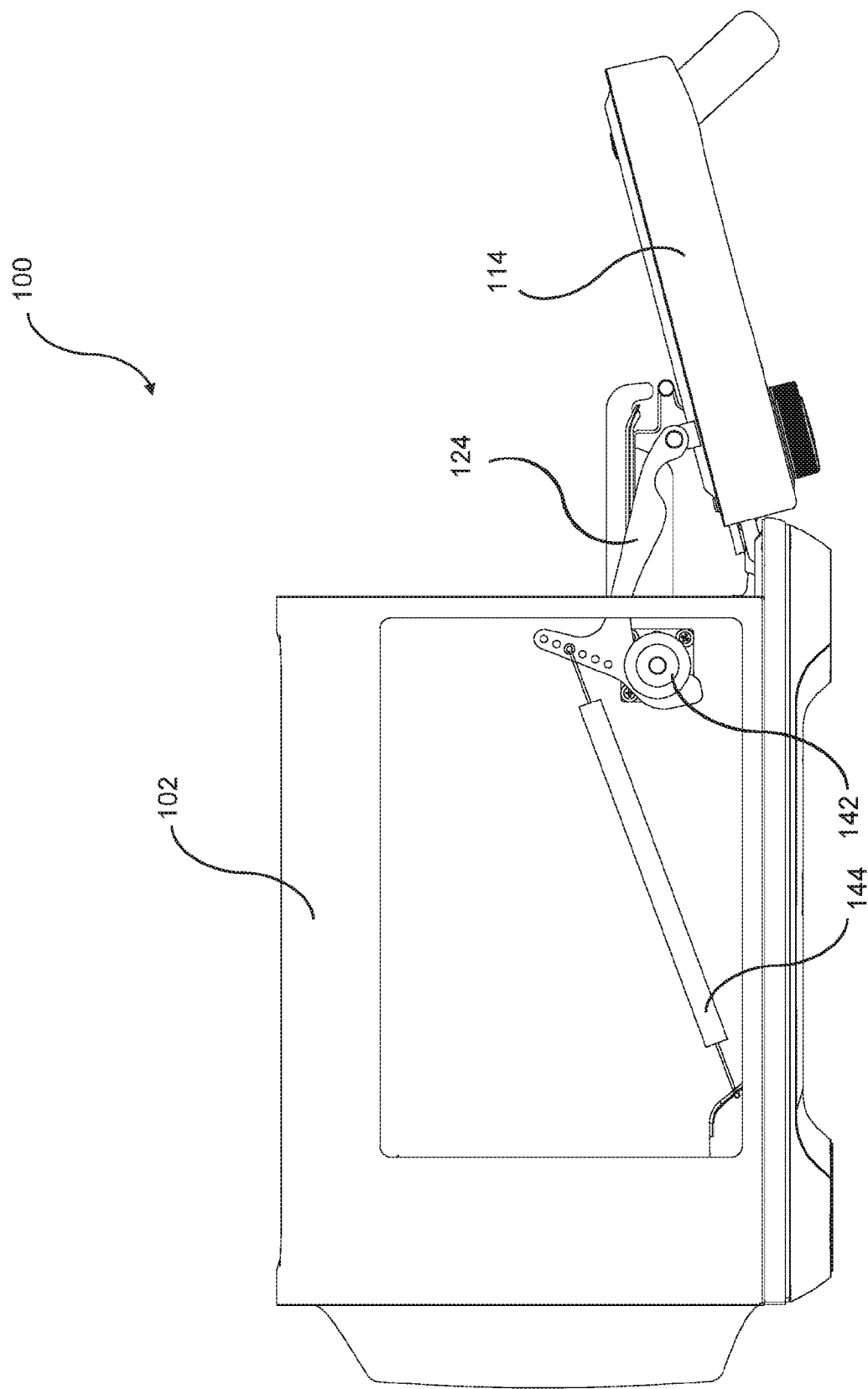
FIG. 13 is a simplified schematic part cut away side view of the cooking appliance of FIG. 9, shown with the door in a maximum open position.

The body 102 has an opening 112 via which the pizza that is to be cooked can be moved in and out of the cavity 110. The opening 112 is closed by a door 114 which is hinged to the body 102 at a lower portion 116 of the door 114 such that an upper portion 118 of the door 114 travels in an arc as the door 114 is opened. The door 114 is movable relative to the body 102 between a closed position at which the door 114 closes the opening 112 (as shown in FIG. 11), and a maximum open position at which the door 114 is spaced from the open position by a maximum predetermined distance (as shown in FIG. 13).

The appliance 100 also preferably includes a pizza deck 120 movably mounted to the floor 104 and door 114 for receiving the pizza.

Figure 12:
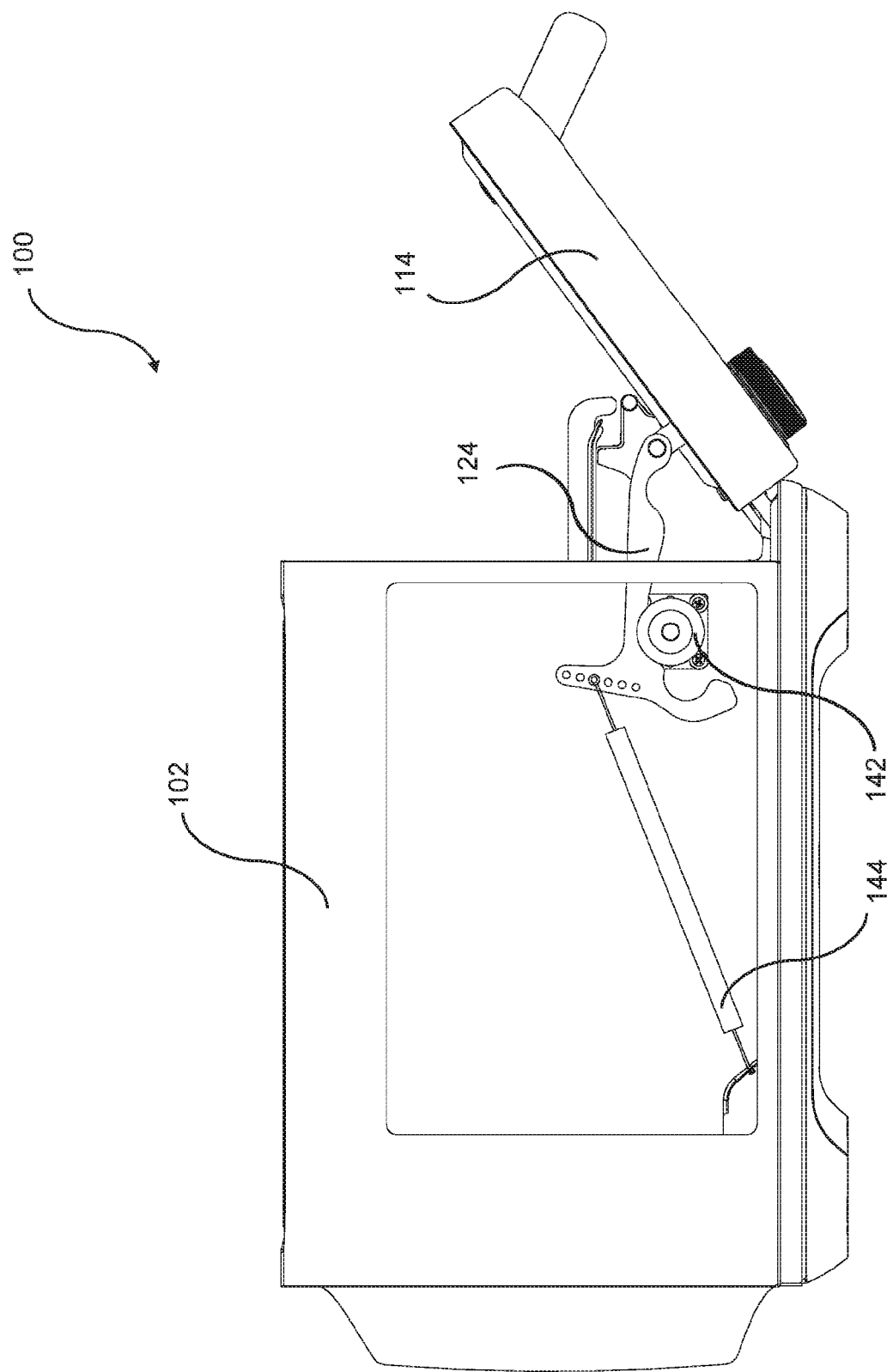
FIG. 12 is a simplified schematic part cut away side view of the cooking appliance of FIG. 9, shown with the door in an intermediate position.

The appliance 100 includes a latch mechanism 122 operatively associated with the body 102 and the door 114 to at least aid in retaining the door 114 in at least one intermediate position at which the door 114 is spaced from the closed position and the maximum open position (as shown in FIG. 12).

Figure 10:
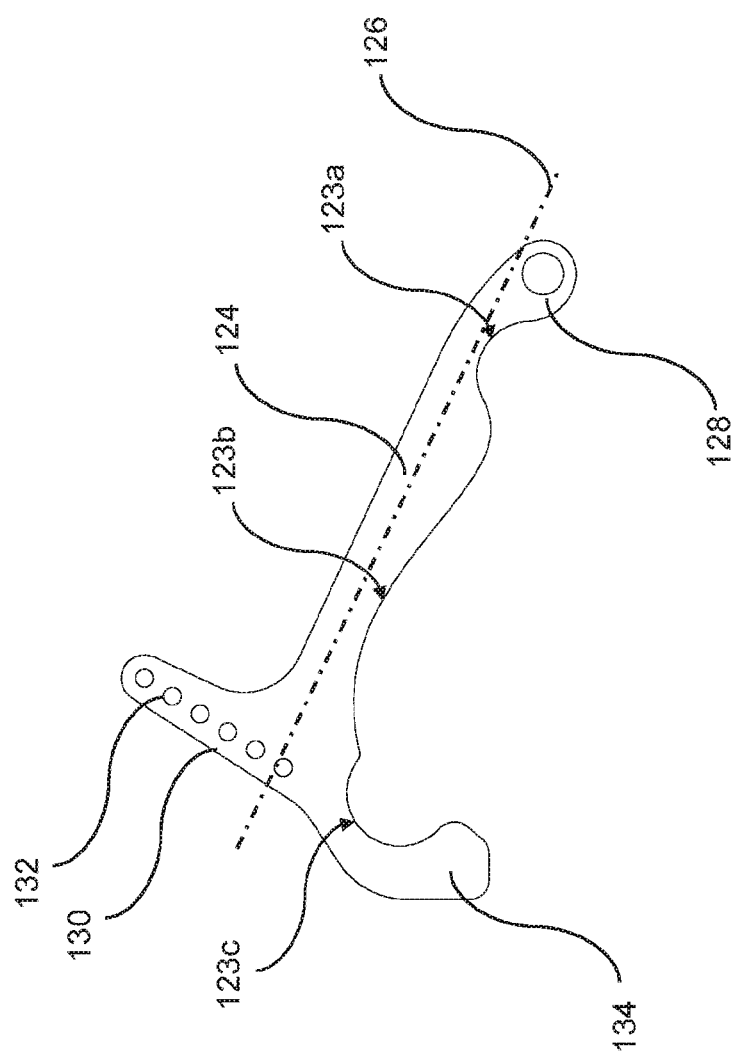
FIG. 10 is a schematic side view of a position defining member of the cooking appliance of FIG. 9.

With particular reference to FIG. 10, the latch mechanism 122 includes a position defining member 124. The position defining member 124 has a plurality of position defining portions in the form of sockets including a first socket 123*a*, a second socket 123*b*, and a third socket 123*c*, with the first socket 123*a* corresponding to the closed position, the second socket 123*b* corresponding to the intermediate position, and the third socket 123*c* corresponding to the maximum open position.

The position defining member 124 is longitudinally elongated and has a longitudinal axis 126. A first end part 128 is pivotally attached to the door 114 via a hinge 140 located at the lower portion 116 of the door 114. A second end part 130 extends generally upwardly transverse of the axis 126 and is attached to the body 102 by a spring 144. The position defining member 124 also has a hook portion 134 adjacent the second end part 130 and extending generally downwardly transverse of the axis 126. In this way, the position defining member 124 is generally shaped in the form of a "pickaxe".

The first socket 123*a* is located adjacent the first end part 128. The third socket 123*c* is located adjacent the second end part 130 and is surrounded by the hook portion 134. The second socket 123*b* is located intermediate the first socket 123*a* and the third socket 123*c*.

With particular reference to FIG. 9, the body 102 has a frame 136 surrounding the opening 112. The frame 136 has a slot 138, positioned relative to the lower portion 116. The position defining member 124 extends through the slot 138 so that the slot 138 locates intermediate the first end part 128 and the second end part 130.

With particular reference to FIGS. 9 and 11 to 13, the latch mechanism 122 also includes an abutment member in the form of a wheel 142 attached to the body 102 adjacent the slot 138. The position defining member 124 is urged into contact with the wheel 142 by the tension of the spring 144 so that the wheel 142 is received in a selected one of the sockets 123*a*, 123*b*, 123*c* so as to at least aid in retaining the door 114 in a selected one of the positions. In this way, as the wheel 142 is received in the first socket 123*a*, the door is retained in the closed position, as shown in FIG. 11. As the wheel 142 is received in the second socket 123*b* the door is retained in the intermediate position, as shown in FIG. 12. As the wheel 142 is received in the third socket 123*c*, the door is retained in the maximum open position, as shown in FIG. 13.

The second end part 130 has a plurality of attachment points in the form of apertures 132 generally aligned along the second end part 130. The spring 144 is configured to be removably attached to one of the apertures 132 to adjust the tension of the spring 144. The spring 144 is fixed at its other end to a rail 146 at an end portion 148 of the rail 146 (as shown in FIG. 9). The rail 146 is attached to the body 102 and located in a lower portion of the cavity 110. The rail end portion 148 is generally upwardly bent towards the opening 112 so that the spring 144 is inclined relative to the floor 104.

By this arrangement, the position defining member 124 is urged into contact with the wheel 142 in a direction having a horizontal component of direction away from the opening 112 towards the cavity 110 and a vertical component of direction toward the floor 104. In this way, contact between the position defining member 124 and the wheel 142 is maintained.

Retaining the door 114 in the intermediate position, provides several advantages. Firstly, when the appliance 100 is used to cook multiple pizzas one after the other, for example, having the door 114 positioned in the intermediate position may reduce the amount of heat escaping from the cavity 110 as each pizza is moved relative to the cavity 110 compared to when the door is in the maximum open position. The user may not need to wait additional time for the cavity 110 to be preheated or return to optimal cooking temperature. Also, there may be less exposure to the deck 120 (which may include a heating stone) and/or heating elements (not shown) inside the cavity 110 thereby reducing the risk of burns, compared to the arrangement in which the door 114 is in the maximum open position.

The invention claimed is:

1. A cooking appliance including:
   a hollow body having an interior to receive a product to be cooked, the body having an opening via which product to be cooked can be moved relative to the interior;
   a door attached to the body and movable relative thereto between a closed position at which the door closes the opening, and a maximum open position at which the door is spaced from the open position by a maximum predetermined distance;
   a latch mechanism operatively associated with the body and the door to at least aid in retaining the door in at least one intermediate position at which the door is spaced from the closed position and the maximum open position, the latch mechanism including an abutment member fixed to the body, and a position defining member attached to the door and the body, the position defining member having a plurality of position defining portions including a first portion, a second portion, and a third portion, with the first portion corresponding to the closed position, the second portion corresponding to the intermediate position, and the third portion corresponding to the maximum open position, with the position defining member being urged into contact with the abutment member so that the abutment member engages with a selected one of the first portion, the second portion, and the third portion so as to at least aid in retaining the door in a selected one of the positions; and
   a carriage located in the hollow body, the carriage including:
      a platform;
      a heating element housed by the platform to heat the interior of the hollow body via radiation and convection;
      a ledge spaced upwardly from the platform;
      a side wall extending between the ledge and the platform;
      a tray supported by the ledge;
      a rim projecting from the side wall between the ledge and the platform; and
      a plate seated by the rim, such that the plate, the side wall, and the platform surround a cavity in which the heating element is located, and such that the plate is located below the tray so as to be positioned between the tray and the heating element so that radiation produced by the heating element is directed at the plate.

2. The appliance of claim 1, wherein the position defining member includes sockets, each socket corresponding to a respective one of the position defining portions, with the abutment member received within a selected one of the sockets to retain the door in the selected position.

3. The appliance of claim 1, wherein the position defining member is pivotally attached to the door.

4. The appliance of claim 1, wherein the position defining member is longitudinally elongated, with a first end part pivotally attached to the door, and a second end part attached to the body.

5. The appliance of claim 4, wherein the second end part is attached to the body by a spring that urges the position defining member into contact with the abutment member.

6. The appliance of claim 5, wherein the second end part includes a plurality of attachment points, with the spring being configured to be removably attached to one of the attachment points to adjust tension of the spring.

7. The appliance of claim 6, wherein the abutment member is in the form of a wheel attached to the body.

8. The appliance of claim 7, wherein the door is hinged to the first end part about a lower portion of the door such that an upper portion of the door travels in an arc as the door is opened.

9. The appliance of claim 8, wherein the body has a frame surrounding the opening, with the frame having a slot positioned relative to the lower portion of the door, with the position defining member at least partially extending through the slot.

10. The appliance of claim 1, wherein the plate includes a hole, and the appliance includes a sensor to project through the hole to monitor a temperature of the tray.

11. The appliance of claim 1, wherein the tray has a groove formed along a portion of an underside of the tray for locating the tray on a projection of the ledge.

12. The appliance of claim 1, wherein the appliance includes a rear shield around a rear edge portion of the ledge.

13. The appliance of claim 1, wherein the tray has a lip overhanging a front edge of the ledge.

14. The appliance of claim 1, wherein the plate and tray are laminated so that the plate is fixed to the tray so as to move with the tray.

15. The appliance of claim 1, wherein the plate has a first major surface and a second major surface, wherein the first major surface is exposed to and spaced from the heating element, and wherein the second major surface is spaced from an underside of the tray such that the plate is spaced from the tray so that the tray may be moveable independently to the plate.

* * * * *